United States Patent [19]
Kataoka

[11] Patent Number: 5,789,874
[45] Date of Patent: Aug. 4, 1998

[54] VERTICAL DEFLECTION POLARITY SWITCHING CIRCUIT FOR CRT PROJECTOR

[75] Inventor: Toru Kataoka, Tokyo, Japan

[73] Assignee: NEC Corporation, Tokyo, Japan

[21] Appl. No.: 818,293

[22] Filed: Mar. 14, 1997

[30] Foreign Application Priority Data

Mar. 15, 1996 [JP] Japan ............................ 8-059093

[51] Int. Cl.[6] ............................ H01J 29/70; H01J 29/72
[52] U.S. Cl. ............................ 315/395; 315/403; 348/747
[58] Field of Search ............................ 315/395, 396, 315/397, 403; 348/583, 747

[56] References Cited

U.S. PATENT DOCUMENTS 4,085,425  4/1978  Hamill .
4,857,998  8/1989  Tsujihara et al. .

FOREIGN PATENT DOCUMENTS 61-186079  8/1986  Japan .

*Primary Examiner*—Theodore M. Blum

[57] ABSTRACT

Such vertical deflection polarity switching circuit for CRT projector can be provided that enables external, one-shot operational switching of the vertical deflection polarity. To switch a CRT projector from a hanging type to a floor type, the switching circuit receives a vertical deflection polarity switching signal from an external device, so that an input sawtooth waveform polarity switching circuit will switch the polarity of a V. SAW signal. At the same time as the polarity of the input sawtooth waveform is switched, power-supply switching circuits switch the driving power-supply voltage of a vertical deflection-use output amplifier. Thus, the polarity of voltage waveforms applied to a vertical deflection yoke is inverted. Also, the polarity of vertical deflection and that of vertical-system data of correction waveforms for use in each of output circuits for horizontal deflection convergence focus are switched. Thus, it is possible to switch the vertical deflection polarity without turning off the power supply of an arrangement set nor opening its top cover.

3 Claims, 3 Drawing Sheets

VERTICAL DEFLECTION POLARITY SWITCHING CIRCUIT FOR CRT PROJECTOR

BACKGROUND OF THE INVENTION

The present invention relates to vertical deflection polarity switching circuit for CRT projector.

Description of the Prior Art

An example of the construction of vertical deflection polarity switching circuit of CRT projector is shown in FIG. 1. This conventional example for the CRT projector, when it is changed from a hanging type to a floor type (hereinafter called vertical deflection polarity switching, too), would allow the insertion position of a vertical deflection-use coil 31 to be switched from a vertical deflection polarity switching connector 32 to a vertical deflection polarity switching connector 33, thereby switching the direction of vertical deflection current to be fed to a vertical deflection-use coil 35 from a direction 40 to a direction 41 so that the vertical deflection polarity can be switched.

Moreover, the conventional switching circuit would detect a switching in the polarity of vertical deflection, to set vertical-system data of the correction waveforms for each circuit of the horizontal deflection convergence focus by switching vertical-system correction data for each circuit, using switching circuits 36, 37, and 38.

In Japanese patent laid-open publication Sho No. 61186079 entitled "Electron View Finder for Use in TV Camera," which is similar, in technological field, to the present invention, such a construction is employed that built-in transfer contacts would be switched automatically according to a direction in which they are attached to the body of a TV camera and also that, when an attaching operation is made to that body, through those transfer contacts, the polarity of the voltage applied on the vertical or horizontal coil of the CRT would be inverted. According to this patent application, this construction will permit the user to get erecting images always on the finder without any artificial operations of the switches, no matter whether he may change the attaching positions to the right or left on the TV camera body.

See the description about the magnetic deflection circuit on pp. 85–86 and FIGS. 4–44 and 4–45 of a technology report entitled "Introduction to AV Electronic Circuit," issued on Mar. 1, 1988 by Masakazu Kitamura, Tsutomu Hirano, and Katsuaki Tomoda.

However, when the above mentioned conventional CRT projector is changed from a hanging type to a floor type, in order to switch the polarity of vertical deflection, it is necessary to change the position where the connectors are inserted and also the direction of the vertical deflection current to be fed to the vertical deflection coil. Any vertical deflection circuit output amplifier relating to the present invention comprises only a pumping circuit 39, which switches plasma power supply during vertical tracing and vertical retracing, to reduce power dissipation. Therefore, such type of projectors would suffer a problem that in switching it is necessary to turn off the power supply for arrangement set and also to open the top cover.

SUMMARY OF THE INVENTION

It is therefore an object of the present invention to provide a CRT projector's vertical deflection polarity switching circuit which enables the switching of the polarity of vertical deflection by one-shot operation externally.

To this end, a CRT projector's vertical deflection polarity switching circuit according to the present invention comprises, to enable switching of vertical deflection, input sawtooth waveform switching means which switches the polarity of input sawtooth waveforms to be entered into a vertical deflection output amplifier driving vertical deflection yokes; power-supply switching means which detects the polarity of input sawtooth waveforms to switch the driving power-supply voltage for vertical deflection-use output amplifiers; and vertical-system switching means which switches the vertical-system data of correction waveforms for each circuit provided for horizontal deflection convergence focus.

Preferably, the above mentioned switching of vertical deflection should be made in such a way that with the switching of both the power-supply switching means and the vertical switching means under the control of the input sawtooth waveform switching means, the switching operations would be carried out based on a vertical deflection switching signal when this signal is received by the input sawtooth waveform polarity switching means.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
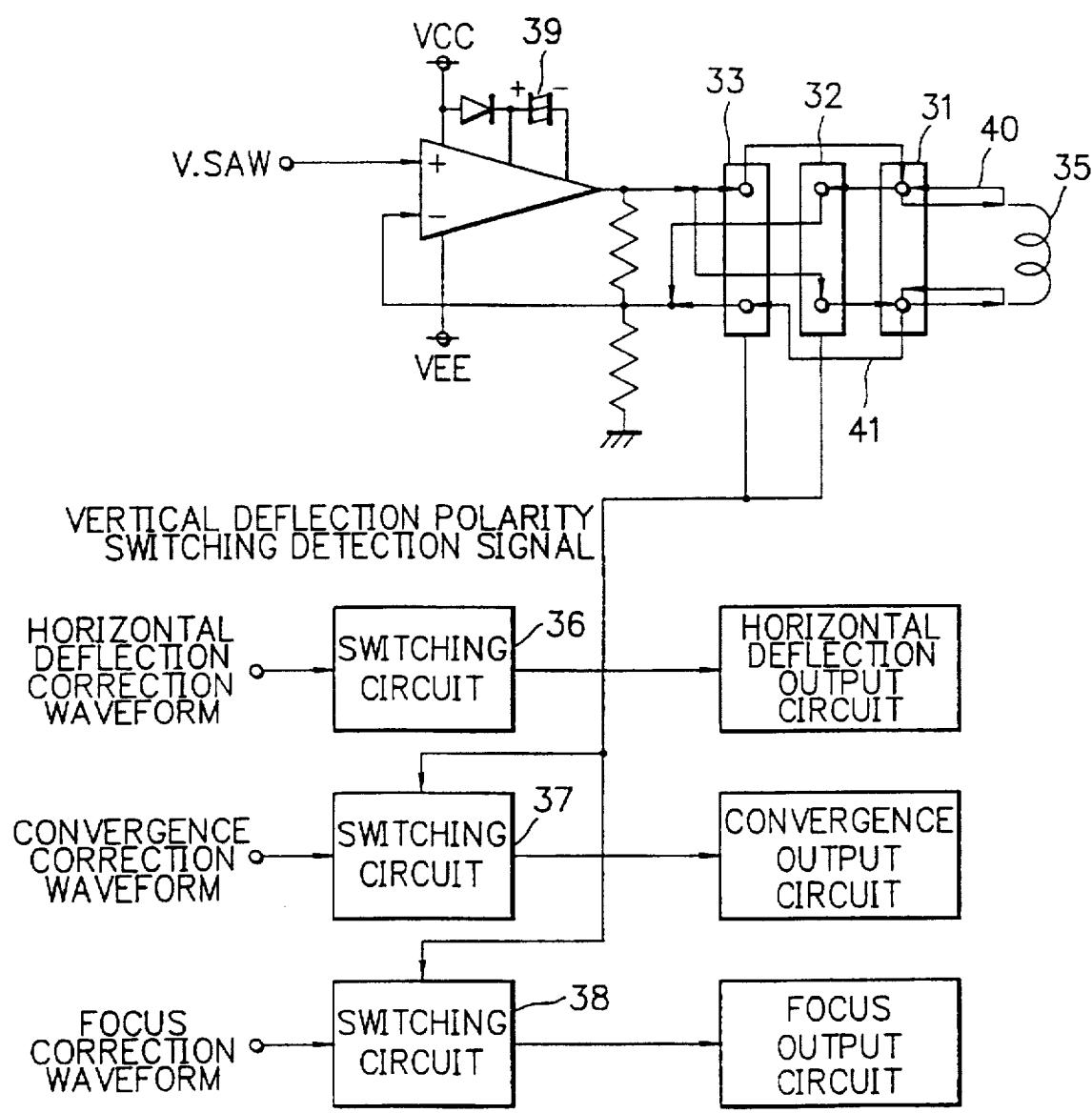
FIG. 1 is a block diagram illustrating an example of the construction of conventional CRT projector's vertical deflection polarity switching circuit.
Figure 2:
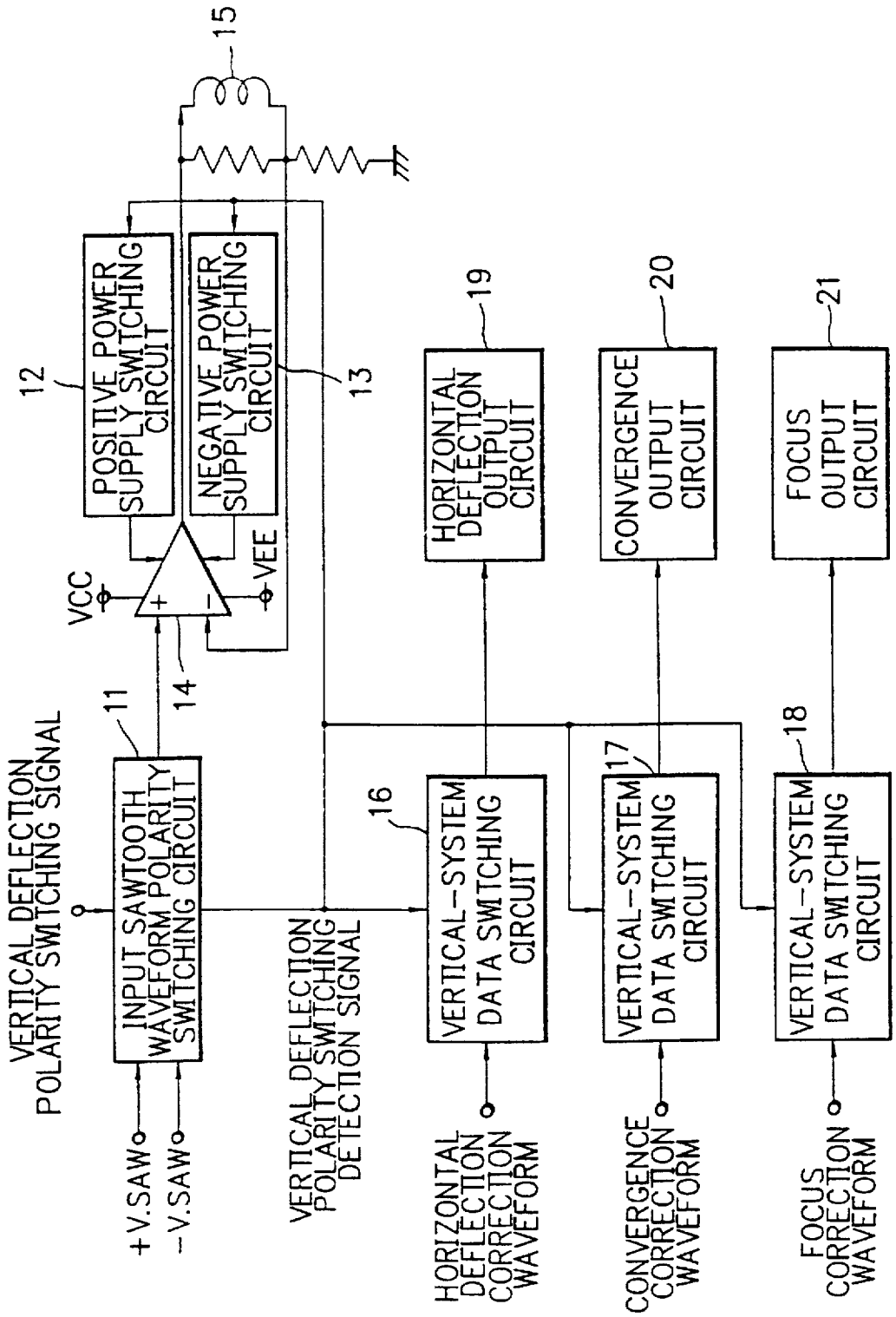
FIG. 2 is a block diagram illustrating the circuit construction of the main portions of CRT projector's vertical deflection polarity switching circuit according to the present invention.

Various embodiments of CRT projector's vertical deflection polarity switching circuitry according to the present invention will be described in detail with reference to the accompanying drawings. FIGS. 2 through 5B show an embodiment of CRT projector's vertical deflection polarity switching circuit according to the present invention. FIG. 2 is a block diagram which shows an example of the construction of a CRT projector's vertical deflection polarity switching circuit based on this embodiment. FIGS. 3A through 5B show waveforms necessary to describe the operations of this embodiment.

The vertical deflection polarity switching circuit for CRT projector shown in FIG. 2 comprises an input sawtooth polarity switching circuit 11; a positive power-supply switching circuit 12; a negative power-supply switching circuit 13; a vertical deflection-use output amplifier 14; a vertical deflection yoke 15; a vertical-system data switching circuit 16 for horizontal deflection circuit-use correction waveforms; a vertical-system data switching circuit 17 for convergence circuit-use correction waveforms; a vertical data switching circuit 18 for focus circuit-use correction waveforms; a horizontal deflection output circuit 19; a convergence output circuit 20; and a focus output circuit 21.

Figure 3A:
FIGS. 3A and 3B both show an example of input sawtooth waveforms at the time of vertical polarity switching.
Figure 3B:

As for a vertical deflection polarity switching circuit for CRT projector having the above mentioned construction, FIGS. 3A and 3B show the shapes of those sawtooth waveforms which are fed to the input sawtooth waveform polarity switching circuit 11. FIGS. 3A and 3B show a positive sawtooth waveform (+V. SAW) and a negative sawtooth waveform (-V. SAW) respectively.

Figure 4A:
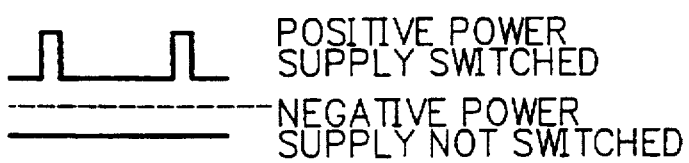
FIGS. 4A and 4B both show an example of switched waveforms of the positive/negative power supply.
Figure 4B:
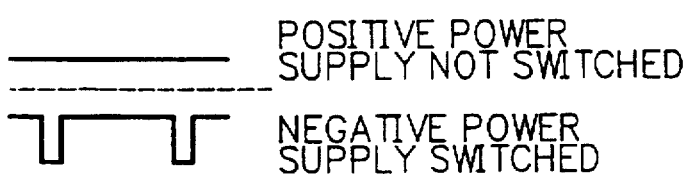

FIGS. 4A and 4B show the shapes of the waveforms of driving power-supply voltage applied to the vertical deflection-use output amplifier 14. FIG. 4A shows an example of application voltage waveforms at the time of the entering of a positive sawtooth waveform (+V. SAW), while FIG. 4B shows an example of application voltage waveforms at the time of the entering of a negative sawtooth (-V. SAW). Positive power supply and negative power supply presented in FIGS. 4A and 4B are applied after they are switched at the positive power-supply switching circuit 12 and the negative power-supply switching circuit 13 respectively. The above mentioned power supply to be applied is switched on the basis of a vertical deflection polarity switching detection signal to be entered to the power-supply switching circuits 12 and 13 respectively.

Figure 5A:
FIGS. 5A and 5B both show an example of switched waveforms of the vertical deflection yoke.
Figure 5B:

FIGS. 5A and 5B both show a waveform fed out from the vertical deflection-use output amplifier 14, i.e. waveform of voltage to be applied to the vertical deflection yoke 15. Note here that FIG. 5A corresponds to FIGS. 3A and 4A, while FIG. 5B corresponds to FIGS. 3B and 4B.

With the CRT projector's vertical deflection polarity switching circuit, which comprises the above mentioned components, according to this embodiment, when the CRT projector is changed from a hanging type to a floor type, a vertical deflection polarity switching signal is received at the input sawtooth waveform switching circuit 11, to make switching between positive sawtooth waveforms and negative sawtooth waveforms, whose resultant output is then fed to the vertical deflection output amplifier 14.

The vertical deflection output amplifier 14 applies a vertical deflection current to the vertical deflection yoke 15 in such a way that it amplifies the voltage of the +V. SAW and -V. SAW signals fed out from the input sawtooth waveform polarity switching circuit and then feeds out an amplified voltage. The vertical deflection yoke 15 is a coil which deflects upward and downward the electron beam released from the CRT's electron gun, to control rasters on the CRT phosphor.

The positive power-supply switching circuit 12, as shown in FIG. 4A, raises a level of voltage for the positive output stage only during vertical retracing when a positive sawtooth waveform is entered to the vertical deflection output amplifier 14, while the voltage for the negative output stage is not subject to power-supply switching during vertical retracing. The negative power-supply switching circuit 13, as shown in FIG. 4B, also raises a level of voltage for the negative output stage only during vertical retracing when a negative sawtooth waveform is entered 14. In this case, the voltage for the positive output stage is not subject to power-supply switching during vertical retracing. Therefore, it is possible to deflect the levels of the +V. SAW or -V. SAW voltage regardless of which one of those voltage states is entered to the vertical deflection output amplifier 14, without increasing the power dissipation.

The vertical data switching circuit 16 for the correction waveforms for the horizontal deflection circuit automatically detects a signal of sawtooth waveforms (V. SAW) sent from the input sawtooth waveform switching circuit 11 immediately when the polarity of that signal is switched between the positive and negative levels, so that it may switch the vertical data for correction waveforms for the horizontal deflection circuit and then feed out the resultant correction waveforms to the horizontal deflection output circuit 19.

The vertical-system data switching circuit 17 for the correction waveforms for the convergence circuit automatically detects a V. SAW signal from the input sawtooth waveform polarity switching circuit 11 when the polarity of that signal is switched between the positive and negative states, so that it may switch the vertical data for correction waveforms for the convergence circuit and then feed out the resultant correction waveforms to the convergence circuit 20.

The vertical data switching circuit 18 for focus correction waveforms automatically detects a signal of V. SAW from the input sawtooth waveform polarity switching circuit 11 when the polarity of that signal is switched between the positive and negative states, so that it may switch the vertical-system correction waveform data and then feed out the resultant correction waveforms to the focus output circuit 21.

According to this embodiment, a CRT projector can be switched from a hanging type to a floor type by switching the polarity of the V. SAW signal when a vertical deflection polarity switching signal is received from an external device so that it may be possible to switch the polarity of vertical deflection and that of the correction waveform's vertical data for each horizontal deflection convergence focus output circuit. With this, there is no need to turn off the power supply of an arrangement set nor to open the top cover when the vertical deflection polarity is switched. Moreover, the power-supply voltage of the vertical deflection output amplifier is also switched to an optimal level at the time of vertical deflection polarity switching, so that the power dissipation can be reduced, easily realizing the unregulated operations of the horizontal deflection convergence focus circuit.

Although the present invention has been described in its preferred but not-limiting embodiment, various modifications will become possible without departing from the spirit and the scope of the present invention. Although, for example, the above mentioned embodiment has been described concerning the switching of the vertical deflection polarity and that of the polarity of vertical data of correction waveforms for use in the horizontal deflection convergence focus circuit, the present invention can be applied also to the switching of the polarity of the vertical data of correction waveforms for a video circuit system.

As can be seen from the above description, the CRT projector's vertical deflection polarity switching circuitry according to the present invention will switch the polarity of the input sawtooth waveforms entered to a vertical deflection-use output amplifier which drives the vertical deflection yoke, so that, when this polarity is detected, the power-supply voltage which drives the vertical deflection output amplifier may be switched. Moreover, the circuit according to the present invention will switch the vertical data of correction waveforms for use in each horizontal convergence focus circuit and then will it also switch the vertical deflection. Thus, the vertical deflection polarity can be switched by using an external input signal without turning off the arrangement set power supply nor opening the top cover. At the same time, during the switching of the vertical deflection polarity, the power-supply voltage for the vertical deflection output amplifier is switched on the optimal conditions, so that the power dissipation can be easily reduced, realizing the unregulated operations of the horizontal deflection convergence focus circuit.

What is claimed is:

1. Vertical deflection polarity switching circuit for CRT projector comprising:

input sawtooth waveform polarity switching means for switching the polarity of input sawtooth waveforms entered to a vertical deflection-use output amplifier which drives vertical deflection yokes;

power-supply switching means for switching driving power-supply voltage of said vertical deflection-use output amplifier when it has detected polarity of said input sawtooth waveforms; and vertical-system switching means for switching vertical-system data of correction waveforms in response to a signal from said input sawtooth waveform polarity switching means in order to provide horizontal deflection convergence focus.

2. Vertical deflection polarity switching circuit for CRT projector as claimed in claim 1, wherein said input sawtooth waveform polarity switching means switches vertical deflection by controlling switching operations of said power-supply switching means and said vertical-system switching means.

3. Vertical deflection polarity switching circuit as claimed in claim 2, wherein said input sawtooth waveform polarity switching means receives a vertical deflection polarity switching signal and then controls said switching operations based on this vertical deflection polarity switching signal.

* * * * *